United States Patent
Makiyama et al.

(10) Patent No.: US 7,172,034 B2
(45) Date of Patent: Feb. 6, 2007

(54) BORING CONTROL METHOD

(75) Inventors: Tadashi Makiyama, Fukuyama (JP); Hiroyuki Kurokawa, Fukuyama (JP); Toshihiko Amako, Fukuyama (JP)

(73) Assignee: Horkos Corp., Hiroshima (JP)

( * ) Notice: Subject to any disclaimer, the term of this patent is extended or adjusted under 35 U.S.C. 154(b) by 130 days.

(21) Appl. No.: 10/516,214

(22) PCT Filed: May 22, 2003

(86) PCT No.: PCT/JP03/06427

§ 371 (c)(1),
(2), (4) Date: Nov. 30, 2004

(87) PCT Pub. No.: WO03/101651

PCT Pub. Date: Dec. 11, 2003

(65) Prior Publication Data
US 2005/0226692 A1    Oct. 13, 2005

(30) Foreign Application Priority Data
May 31, 2002    (JP) .............................. 2002-158851

(51) Int. Cl.
*B23Q 15/00*    (2006.01)
*B23Q 5/00*    (2006.01)
*B23B 39/08*    (2006.01)

(52) U.S. Cl. .................... 173/1; 173/4; 408/11; 408/17

(58) Field of Classification Search .................... 173/1, 173/4, 5, 6, 11, 176; 175/24, 57; 408/1 C, 408/10, 11, 18, 17
See application file for complete search history.

(56) References Cited

U.S. PATENT DOCUMENTS

| | | | | |
|---|---|---|---|---|
| 4,536,849 A | * | 8/1985 | Borisch et al. | 702/42 |
| 4,612,831 A | * | 9/1986 | Lehmkuhl | 82/1.4 |
| 4,944,643 A | * | 7/1990 | Lehmkuhl | 409/80 |
| 5,150,306 A | * | 9/1992 | Kawamura et al. | 700/192 |
| 5,349,337 A | * | 9/1994 | McCormick | 340/680 |
| 5,378,091 A | * | 1/1995 | Nakamura | 409/132 |
| 5,599,142 A | * | 2/1997 | Fujimoto et al. | 408/10 |
| 6,029,754 A | * | 2/2000 | Kattentidt et al. | 175/27 |
| 6,728,595 B2 | * | 4/2004 | Hamamura et al. | 700/188 |
| 6,938,702 B2 | * | 9/2005 | Saha et al. | 173/1 |

* cited by examiner

*Primary Examiner*—Stephen F. Gerrity
*Assistant Examiner*—Paul Durand
(74) *Attorney, Agent, or Firm*—Koda & Androlia

(57) ABSTRACT

A boring control method for a machine tool for automatically boring a deep hole using a central control means performing boring with programmed control. In the boring, the number of processing and steps of the machine tool is kept minimum, load torque of a tool is detected continuously using torque detection means, and the movement of the tip portion of the tool desired for a piece of work is confirmed from a reference point to a hole bottom using a Z-axis movement device. The boring is continued in each step until the load torque exceeds a predetermined torque limit value, performed in a condition where a main shaft rotation number, or rotation speed of the tool, and feed speed form a specific pattern, and a condition is set where a total step number (f) does not exceed a predetermined limit step number (N).

7 Claims, 6 Drawing Sheets

BORING CONTROL METHOD

CROSS-REFERENCE TO RELATED APPLICATIONS

This application claims priority based upon PCT Application No. PCT/JP03/06427.

BACKGROUND OF THE INVENTION:

1. Field of Invention

The present invention relates to a boring control method for boring deep holes while minimizing the working time and number of steps of a machine tool.

2. Description of Related Art

Boring control methods found in the prior art include Japanese Patent Application Laid-Open (Kokai) (Kokai) No. H4-240011 "Boring Method." Here, it is indicated that "in cases where the load torque is equal to or less than a specified torque during boring, the drill feed is continued, and the drill is temporarily withdrawn at the point in time at which the drill has cut in by a specified amount from the position where the drill begins to cut into the workpiece, while in cases where the load torque exceeds a specified torque during boring, the feeding of the drill is stopped, and the drill is temporarily withdrawn. When the drill is withdrawn, the working conditions of boring are altered; boring is re-initiated under the altered working conditions, and boring is ended at the point in time at which the bored hole reaches a specified depth".

In Japanese Patent Application Laid-Open (Kokai) (Kokai) No. H4-240011 "Boring Method", which is a boring control method found in the prior art, since "in cases where the load torque is equal to or less than a specified torque during boring, the drill feed is continued, and the drill is temporarily withdrawn at the point in time at which the drill has cut in by a specified amount from the position where the drill begins to cut into the workpiece", this method has drawbacks. Namely, the number of steps is excessively large, so that the working time is prolonged. Furthermore, if there are numerous step operations, an impact force acts on the drill cutting tip when the drill bites in, so that the drill is easily damaged, and the problem of early wear arises. If the torque limit value which is a threshold value is set at a high value, the drawbacks of extreme wear, damage and impossibility of reutilization are encountered. Moreover, since "the working conditions of boring are altered, and boring is reinitiated under the altered working conditions", these working conditions cause a stepwise decrease in the feeding rate, so that the problem of a prolonged working time is encountered.

SUMMARY

In order to solve the above-described problems, the boring control method of the present invention is characterized by the fact that in all of the respective steps of the boring stage, boring is continued until the load torque of the machine tool exceeds a specified predetermined torque limit value.

The boring control method of the present invention is characterized by the fact that for the respective steps in the boring stage, the working conditions comprised of a main shaft rotation number (S) which is the rotational speed of the machine tool, and the feeding rate (F) of this tool, are set as fixed working conditions comprised of a specified pattern.

The boring control method of the present invention is further characterized by the fact that a mist generator, which produces a mist-form mixture comprising a cutting liquid and compressed air and which forcibly cools the machine tool up to the cutting tip with the minimum cutting liquid supply amount (Q), is provided inside the main shaft unit that holds and rotates the tool, the tool cooling conditions including variations over time during operation are controlled using a mist control means that controls the mist generation conditions of the mist generator, and each time the step increases, at least the cool tooling effect is increased in a stepwise manner.

The boring control method of the present invention is still further characterized by the fact that a condition which is such that the total number of steps f does not exceed a predetermined limiting step number N.

Figure 1:
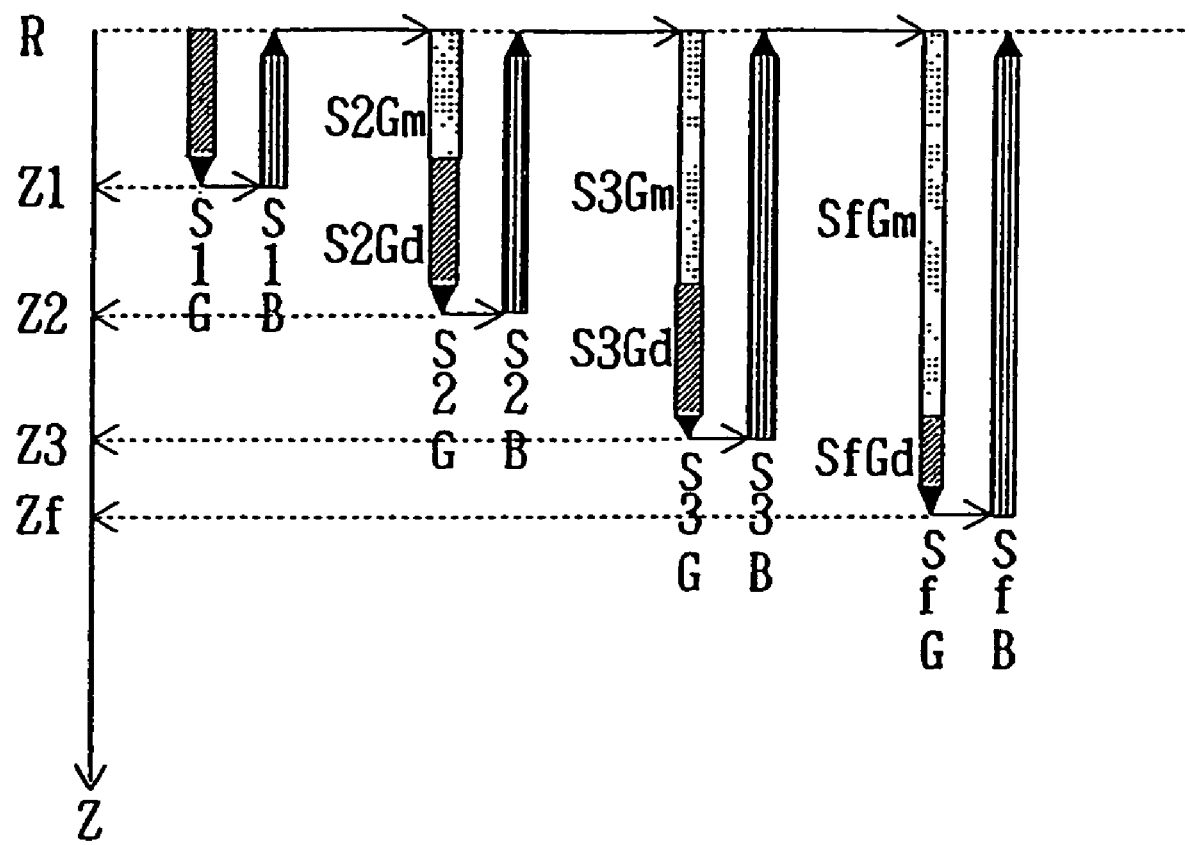
FIG. 1 is an outline process explanatory diagram of a boring control method, showing Embodiment 1 of the present invention.

An explanation of the symbols used in the figures is shown below for reference.

These symbols are used as additional notes in the text below.
  1 Tool
  2 Main shaft unit
  2*a* Mist generator
  3 Cutting liquid supply means
  4 Compressed air supply means
  5 Mist control means
  6 Z axis moving device
  7 Movement control means
  8 Main shaft control means
  9 Input-output control means
  10 Workpiece
  20 Central control means
  e Withdrawal point distance
  i Biting distance
  s Return distance
  F Feeding rate (mm/min)
  $N_s$ Number of times load torque is read
  Q Cutting liquid supply amount
  Pr Air pressure
  R Reference point
  Sn n-th step
  Sf Final f step
  S Main shaft rotation number
  SnG n-th forward path step
  SnGe n-th forward path step withdrawal point SnGi n-th forward path step bite
SnGm n-th forward path step movement
SnGd n-th forward path step cutting
SnB n-th return path step
SnBs n-th return path step return
SnBm n-th return path step movement
$ST_{TR}$ R Load torque sampling time
TR Torque rate
$TR_{LIM}$ Limit torque rate
Tr Torque
Zn n-th cut hole-bottom
Znr n-th cutting reference point
Zf Hole-bottom (final f hole-bottom)

BEST MODE FOR CARRYING OUT THE INVENTION

The boring control method of the present invention is a boring control method for a machine tool which automatically bores deep holes using a central control means that performs a boring process by program control that uses a tool as a cutting implement while constantly detecting the load torque of the tool using a torque detection means, and while checking the position of the tip end portion of the tool from a desired reference point (R) in the direction of Z axis of the workpiece to a hole-bottom (Zf) using a Z axis movement device, and the method is characterized in that the boring process is executed so that:

in the first step (S1),
   the forward path step process (S1G) comprising the first forward path step cutting process (S1Gd) constituting a boring cutting process is initiated from the reference point (R) under fixed working conditions comprised of a specified pattern including working conditions comprised of a main shaft rotation number (S) which is the rotational speed of the tool,
   the feeding rate (F) of the tool is stopped in cases where the load torque exceeds the torque limit value ($TR_{LIM}$), which is a specified predetermined threshold value, at the first cut hole-bottom (Z1), and
   the tool is withdrawn to the reference point (R) under fixed withdrawal conditions comprising a specified pattern in the return path step process (S1B); and
subsequently, in the second step (S2),
   the tool is moved from the reference point (R) to the vicinity of the first cut hole-bottom (Z1) in the forward path step movement process (S2Gm) of the forward path step process (S2G), and the second forward path step cutting process (S2Gd) which is a boring cutting process is initiated under fixed working conditions comprised of a specified pattern,
   the feeding rate (F) of the tool is stopped in cases where the load torque exceeds the torque limit value ($TR_{LIM}$) at the second cut hole-bottom (Z2), and
   the tool is withdrawn to the reference point (R) under the withdrawal conditions in the return path step process (S2B); and
such a step (Sn) is repeated; and
in the final (f) step (Sf),
   the tool reaches the hole-bottom (Zf) and the feeding rate (F) of the tool is stopped in the forward path step cutting process (SfGd), and
   the tool is withdrawn to the reference point (R) under the withdrawal conditions in the return path step process (SfB); and
the boring process is ended.

Furthermore, the present invention is characterized by the fact that:
   a condition which is such that the step number f of the final step (Sf) does not exceed a predetermined limiting step number N, i.e., a condition of $1 \leq f \leq N$, is set as the permissible range, and
   a withdrawal and spot-checking process is provided in the boring process, in which at least when the step number f is N and the load torque exceeds the torque limit value ($TR_{LIM}$), the feeding rate (F) of the tool is stopped, the boring process is interrupted and the tool is withdrawn, and the cutting tip of the tool is checked.

The boring control method of the present invention is a boring control method for a machine tool which automatically bores deep holes using a central control means that performs a boring process by program control that uses a tool as a cutting implement while constantly detecting the load torque of the tool using torque detection means, and while checking the position of the tip end portion of the tool from a desired reference point (R) in the direction of Z axis of the workpiece to the hole-bottom (Zf) using a Z axis movement device, characterized in that:
   a mist generator which produces a mist-form mixture comprising a cutting liquid and compressed air, and which forcibly cools the machine tool up to the cutting tip with the minimum cutting liquid supply amount (Q) is provided inside the main shaft unit that holds and rotates the tool, the tool cooling conditions including variations over time during operation are controlled using a mist control means that controls the mist generation conditions of the mist generator, and
the above-described boring process is executed so that:
   in the first step (S1),
      the forward path step process (S1G) comprising the first forward path step cutting process (S1Gd) constituting a boring cutting process is initiated from the reference point (R) under fixed working conditions comprised of a specified pattern including working conditions comprised of a main shaft rotation number (S), which is the rotational speed of the tool, and a feeding rate (F) of the tool, while the tool is cooled under first tool cooling conditions,
      the feeding rate (F) of the tool is stopped in cases where the load torque exceeds the torque limit value ($TR_{LIM}$), which is a specified predetermined threshold value, at the first cut hole-bottom (Z1), and
      the tool is withdrawn to the reference point (R) under fixed withdrawal conditions comprising a specified pattern in the return path step process (S1B); and
   subsequently, in the second step (S2),
      the tool is moved to the vicinity of the first cut hole-bottom (Z1) from the reference point (R) in the forward path step movement process (S2Gm) of the forward path step process (S2G),
      the second forward path step cutting process (S2Gd) which is a boring process is initiated under fixed working conditions comprised of a specified pattern while the tool is cooled under second tool cooling conditions in which the cooling effect is heightened beyond that of the first tool cooling conditions, the feeding rate (F) of the tool is stopped in cases where the load torque exceeds the torque limit value ($TR_{LIM}$) at the second cut hole-bottom (Z2), and the tool is withdrawn to the reference point (R) under the withdrawal conditions in the return path step process (S2B); and such a step (Sn) is repeated; and the cooling effect of the n-th tool cooling conditions is heightened compared to at least the effect of the (n−1)st tool cooling conditions; and in the final (f) step (Sf), the tool reaches the hole-bottom (Zf), and the feeding rate (F) of the tool is stopped in the forward path step cutting process (SfGd), and the tool is withdrawn to the reference point (R) under the withdrawal conditions in the return path step process (SfB); and the boring process is ended.

Furthermore, the present invention is characterized by the fact that:

a condition which is such that the step number f of the final step (Sf) does not exceed a predetermined limiting step number N, i.e., a condition of 1≦f≦N, is set as the permissible range, and a withdrawal and spot-checking process is provided in the boring process, in which at least when the step number f is N and the load torque exceeds the torque limit value ($TR_{LIM}$), the feeding rate (F) of the tool is stopped, the boring process is interrupted and the tool is withdrawn, and the cutting tip of the tool is checked.

In the boring control method of the present invention, the torque detection means that detects the load torque of the tool can be devised so that the load current of the main shaft motor which rotationally drives the main shaft unit to which the tool is attached is detected by the main shaft control means at a specified sampling time ($S_{TR}$=several tens of milliseconds) and read at a specified reading frequency ($N_S$=several times), the mean value (TR) is calculated and taken as the detected torque rate (TR), the torque rate (TR) is used here to express the rated value of the main shaft motor as 100%, the torque limit value ($TR_{LIM}$) which is a specified threshold value is determined beforehand, and if all of the detected torque rates (TR) exceed the torque limit value ($TR_{LIM}$) within a specified detection time ($\Delta T \gg S_{TR} \times N_S$), the feeding rate (F) of the tool is stopped.

In the boring control method of the present invention, the boring process can also be executed so that:

the n-th step (Sn) which has fixed working conditions comprised of a specified pattern consists of a forward path step process (SnG) and a return path step process (SnB), and the above-described forward path step process (SnG) is constructed from a forward path step movement process (SnGm), a forward path step biting process (SnGi), and a forward path step cutting process (SnGd), wherein in the forward path step process (SnG):

the forward path step movement process (SnGm) is initiated in which the tool is moved from the reference point (R) to the n-th cutting reference point Znr=(Zn−1)−s, which is closer to the reference point (R) than the (n−1)st cut hole-bottom (Zn−1) of the preceding step (Sn−1) by a specified return distance s, with the main shaft rotation number (S) first raised to the working rotation number in the forward path step movement process (SnGm), and with the feeding rate (F) set at a relatively rapid feeding rate, in the forward path step biting process (SnGi), biting is performed for a specified biting distance (i) with the main shaft rotation number (S) maintained at the working rotation number, and with the feeding rate (F) set at a relatively slow feeding rate in order to suppress a rise in the load torque caused by unstable conditions resulting from friction, dispersion of heat and the like during the biting of the cutting tip of the tool, and in the forward path step cutting process (SnGd), cutting is initiated with the main shaft rotation number (S) maintained at the working rotation number, and with the feeding rate (F) raised to the working feeding rate, in cases where the load torque exceeds the torque limit value ($TR_{LIM}$) at the n-th cut hole-bottom (Zn), the feeding rate (F) of the tool is stopped, and then the working shifts to the return path step process (SnB), wherein the return path step process (SnB) is constructed from a return path step return process (SnBs) and a return path step movement process (SnBm), and wherein:

in the return path step return process (SnBs), with the main shaft rotation number (S) maintained at the working rotation number, and with the magnitude of the feeding rate (F) maintained at the same cutting conditions of the working feeding rate, the tool is returned by a return distance of s in the direction of the reference point (R), and in the return path step movement process (SnBm), the main shaft rotation number (S) is lowered to a low main shaft rotation number, the feeding rate (F) is raised to a fast-feed feeding rate, the tool is returned to the reference point (R), and the n-th step (Sn) is ended, and the working then shifts to the (n+1)st step (Sn+1) which has fixed working conditions comprised of a similar pattern.

In the boring control method of the present invention, the boring process of the final (f) step (Sf) can be executed so that the f-th step (Sf) which has fixed working conditions comprised of a specified pattern is constructed from a forward path step process (SfG) and a return path step process (SfB), wherein the return path step process (SfB) is the same pattern as the return step process (SnB), and the forward path step process (SfG) is constructed from a forward path step movement process (SfGm), a forward path step biting process (SfGi), a forward path step cutting process (SfGd) and a forward path step withdrawal point process (SfGe), wherein the forward path step movement process (SfGm), forward path step biting process (SfGi) and forward path step cutting process (SfGd) are the same as the corresponding process conditions of the forward path step process (SnG) in cases where f=n, but the newly installed forward path step withdrawal point process (SfGe) is executed so that when the Z axis coordinate position of the tool cutting tip approaches the hole-bottom (Zf) to within a specified withdrawal point distance (e=1–30 mm) during the forward path step cutting process (SfGd), the forward path step withdrawal point process (SfGe) is performed with the main shaft rotation number (S) maintained at the working rotation number, and with the feeding rate (F) decelerated to the withdrawal point feeding rate from the working feeding rate in order to alleviate working instability during withdrawal point working.

The boring control method of the present invention is characterized by the fact that the boring process, including a withdrawal and spot-checking process which has a condition that a predetermined limiting step number N is not exceeded, can be executed so that:

the boring process is initiated in a stage (P0), in the next reference point movement process of a stage (P1), the tool is moved to a reference point (R), in the next forward path step cutting process (SnGd) of a stage (P2), boring cutting is initiated, in the next hole-bottom reaching process of a stage (P3), if the tool does not reach the hole-bottom (Zf), then go to (NO), and boring cutting is continued, in the torque limiting process of a subsequent stage (P4), if the load torque exceeds a torque limit value ($TR_{LIM}$), then go to (YES), and the feeding rate (F) of the tool is stopped, in the step addition process of a subsequent stage (P5), 1 is added to n up to this point so that n=n+1, in the n=N process of a subsequent stage (P6), if n does not equal N, then go to (NO), and if n does not equal N−1 in the n=N−1 process of a subsequent stage (P7), the processing skips to the position reading process of a subsequent stage (P9); however, if n=N−1, notification that the step number n has approached the limiting step number N is made on the display device of the input-output control device, and a warning may also be activated, in the position reading process of a subsequent stage (P9), the position of Z=Zn which is the position where the feeding rate (F) of the tool is stopped is read and confirmed using a Z axis movement device, in the return path step process (SnB) of a subsequent stage (P10), the tool is returned to the reference point (R), and the n-th step (Sn) is ended, in the forward path step movement process (SnBm) of a subsequent stage (P11), the (n+1)st step (Sn+1) is initiated, the tool is moved from the reference point (R) to the (n+1)st cutting reference point Z(n+1)r=(Zn)−s, which is closer to the reference point (R) than the n-th cut hole-bottom (Zn) of the preceding step (Sn) by a return distance of s, and the tool returns to the forward path step cutting process (SnGd) of the stage (P2), on the other hand, in the hole-bottom reaching process of the stage (P3), if the tool reaches the hole-bottom (Zf), then go to (YES), and the feeding rate (F) of the tool is stopped, n is set equal to f in the return path step process (SfB) of a subsequent stage (P20), and the tool is returned to the reference point (R) and stopped, n is reset to zero in the step number reset process of a subsequent stage (P21), the series of boring processes is ended in a subsequent stage (P30), on the other hand, in the n=N process of the stage (P6), if n=N, then go to (YES), a notification that the step number n has reached the limiting step number N is shown on the display device of the input-output control device (9) in an "N times" checking and display process of a subsequent stage (P25), the tool is returned to the reference point (R) and stopped, and the cutting tip of the tool is checked by performing a withdrawal and spot checking process of a subsequent stage (P26), and on the other hand, in the torque limiting process of the stage (P4), in cases where the load torque does not exceed the torque limit value ($TR_{LIM}$) (which is a specified predetermined threshold value), then go to (NO), the tool is returned to the forward path step cutting process (SnGd) of the stage (P2), and the boring cutting is continued.

In the boring control method of the present invention, the setting of the limiting step number N varies according to working conditions such as the tool diameter, material of the workpiece, length of the hole-bottom and the like; however, if extreme wear and damage of the tool, and resulting reutilization, are taken into account, it is desirable that the limiting step number be set at ten or less.

The boring control method of the present invention is a boring control method for a machine tool, in which a mist generator that produces a mist-form mixture of a cutting liquid and compressed air and that cools a tool with the minimum cutting liquid supply amount (Q) is provided in a main shaft unit that holds and rotates the tool, the machine tool has a function that controls the mist generation conditions of the mist generator, and the machine tool includes a device that controls the tool cooling conditions including variations over time during operation using the mist control means basically disclosed in Japanese Patent Application Laid-Open (Kokai) No. 2001-334438 "Cutting Liquid Automatic Supply Device"; the method of the present invention being characterized by the fact that boring that bores deep holes automatically is performed using a central control means that performs a boring process by program control while checking the position of the tip end portion of the tool from a desired reference point (R) in the Z axis direction to the hole-bottom (Zf) using a Z axis movement device via movement control means, a torque detection means that detects the load torque of the tool detect the load current of a main shaft motor (which rotationally drives the main shaft unit) at a specified sampling time using main shaft control means, and the mist control means that controls the mist generation conditions can also control the cutting liquid supply amount (Q) using cutting liquid supply means, or can also control and ensure the air pressure (Pr) of the compressed air that is supplied using compressed air supply means.

In the boring control method of the present invention, the respective steps in the boring process are determined only by a torque limit value ($TR_{LIM}$) which is a specified predetermined threshold value, and working is continued up to this torque limit value. Accordingly, the working distance can be extended to the torque limit value while suppressing damage to the tool. Consequently, the present invention has the effect of minimizing the final step number f, which is the total number of steps. Furthermore, since each step is worked under fixed working conditions comprised of a specified pattern comprising the main shaft rotation number (S) and feeding rate (F), the present invention has the effect of minimizing the working time to the hole-bottom (Zf).

In the boring control method of the present invention, the condition that the step number f of the final step (Sf) does not exceed the predetermined limiting step number N can also be set in the boring process; accordingly, the present invention has the effect of suppressing extreme wear, damage and scratching of the tool, and also has the effect of being suitable for reutilization of the tool.

In the boring control method of the present invention, the forward path step biting process (SnGi) can be set at the time of the initiation of working in each step in the boring process, and the processes can be initiated at a relatively slow feeding rate (F) so that a rise in the load torque caused by unstable conditions such as wear, the dispersion of heat and the like during the biting of the cutting tip of the tool can be suppressed; accordingly, the working distance can be extended to the torque limit value, and an effect that suppresses damage to the tool can also be obtained.

In the boring control method of the present invention, the forward path step withdrawal point process (SfGe) can be set at the time of the completion of working of the final step in the boring process, and the feeding rate (F) can be decelerated from the working feeding rate to the withdrawal point feeding rate, so that working instability of the cutting tip of the tool during withdrawal point working can be ameliorated, thus suppressing a rise in the load torque. Accordingly, the working distance can be extended to the torque limit value, and the present invention also has an effect that suppresses damage to the tool.

If the boring control method corresponding to another embodiment of the present invention is compared with the method corresponding to a first embodiment, it is seen that the boring control method has an increased number of steps, and the tool cooling effect is greatly increased; accordingly, the main shaft torque rate is gradually reduced, the final step (Sf) number f is reduced, and the present invention has an effect that suppresses damage to the tool.

Figure 2:
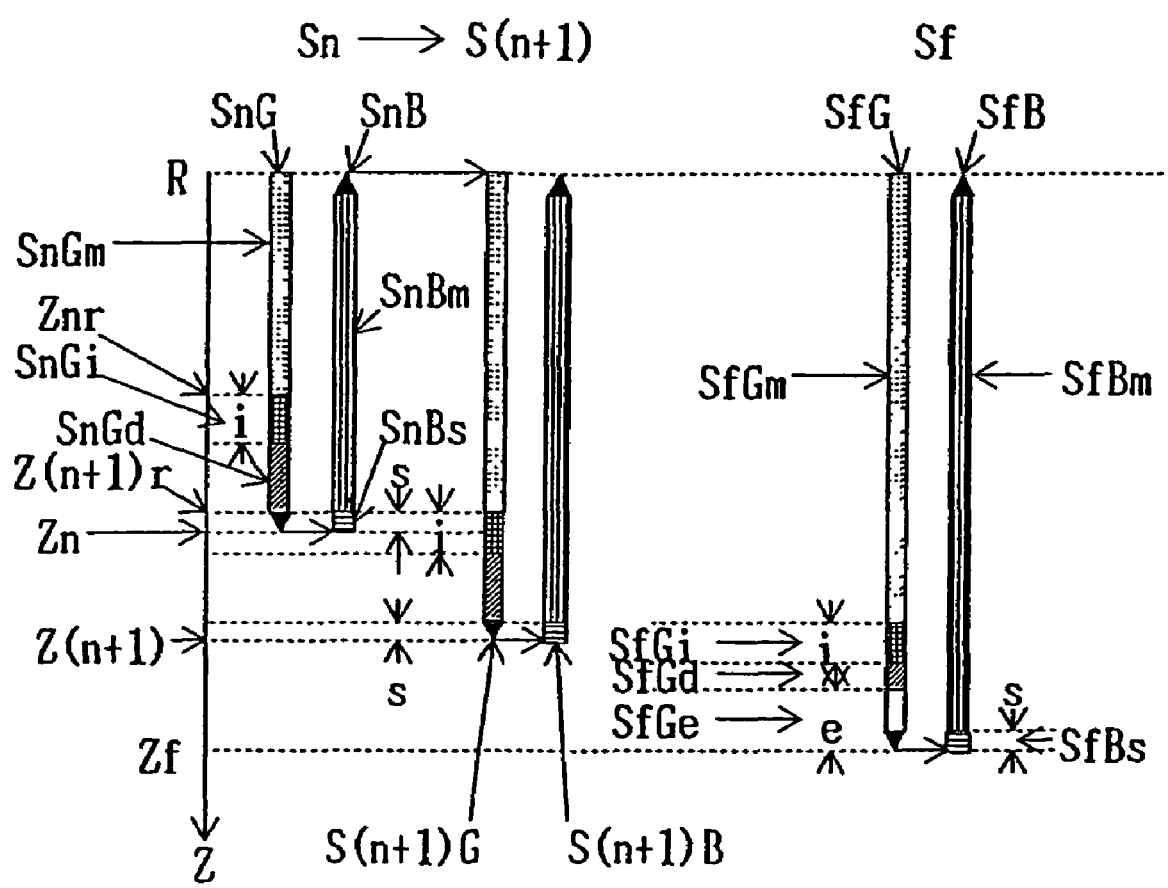
FIG. 2 is a detailed process explanatory diagram of a boring control method, showing Embodiment 2 of the present invention.
Figure 3:
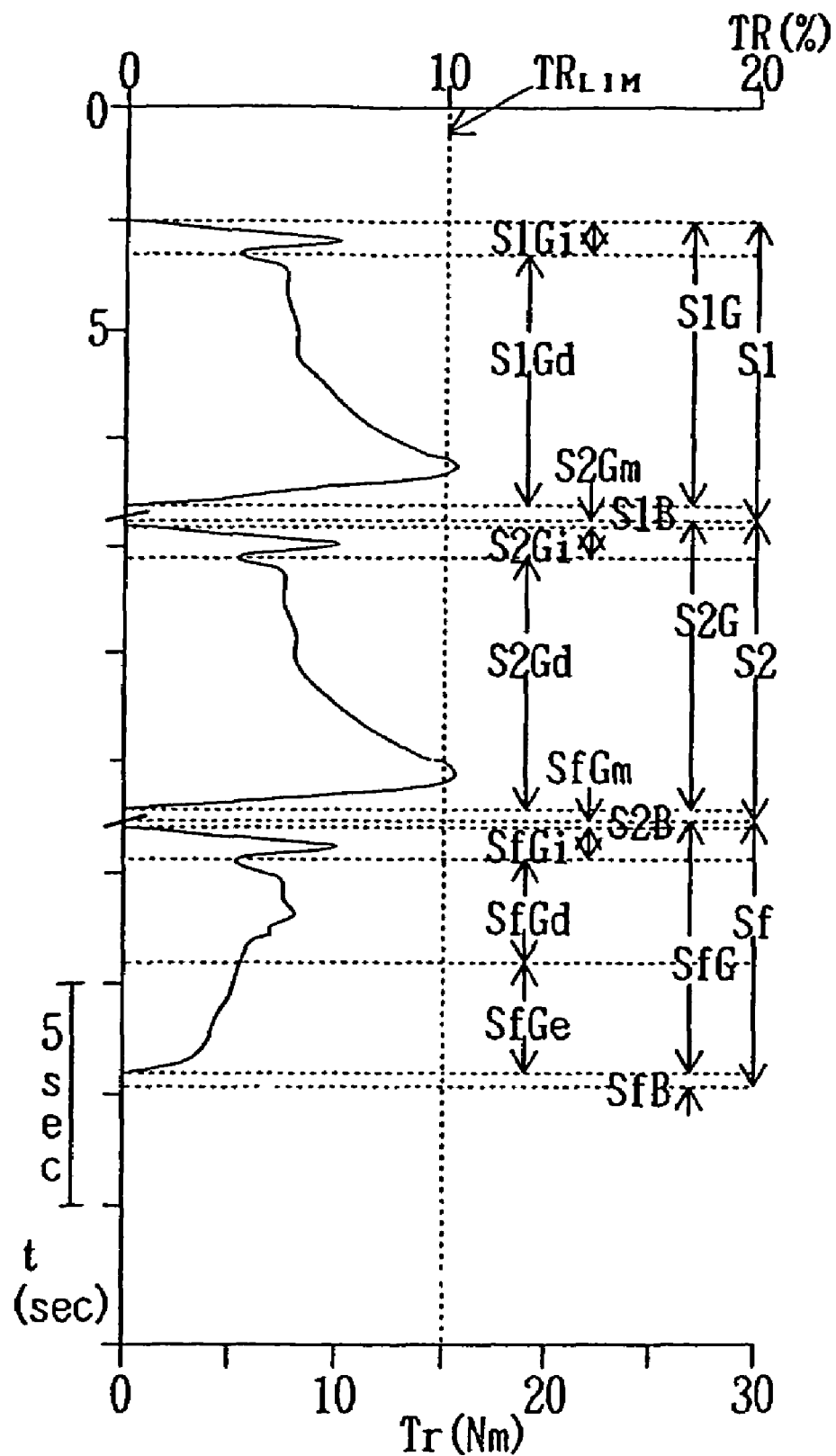
FIG. 3 is a partially abbreviated explanatory diagram of the main shaft torque rate variation characteristics corresponding to various processes in the boring control method showing Embodiment 3 of the present invention.
Figure 4:
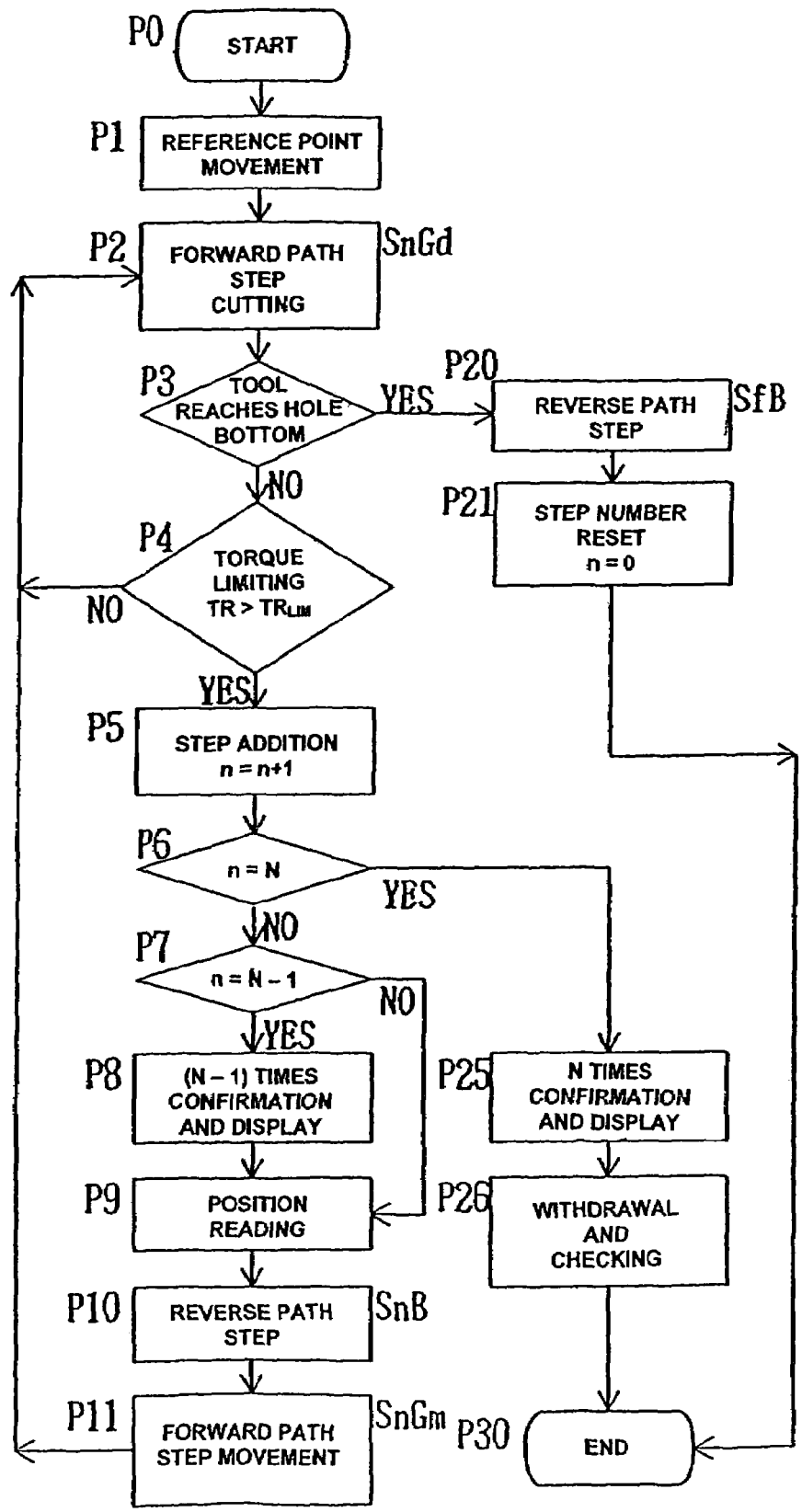
FIG. 4 is an outline process flow chart of a boring control method, showing Embodiment 4 of the present invention.
Figure 5:
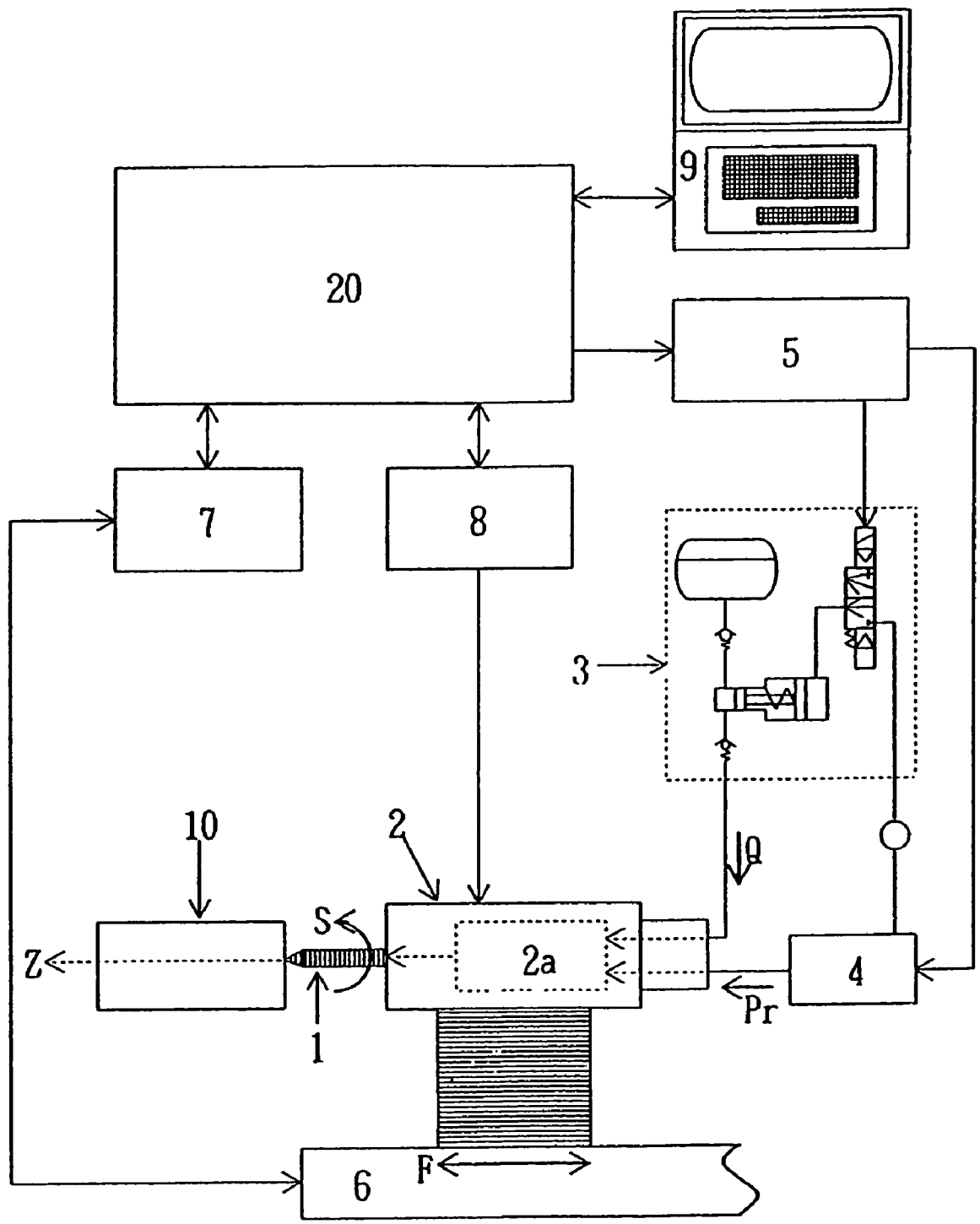
FIG. 5 is an explanatory diagram of the schematic apparatus used in the boring control method showing Embodiment 6 of the present invention.
Figure 6:
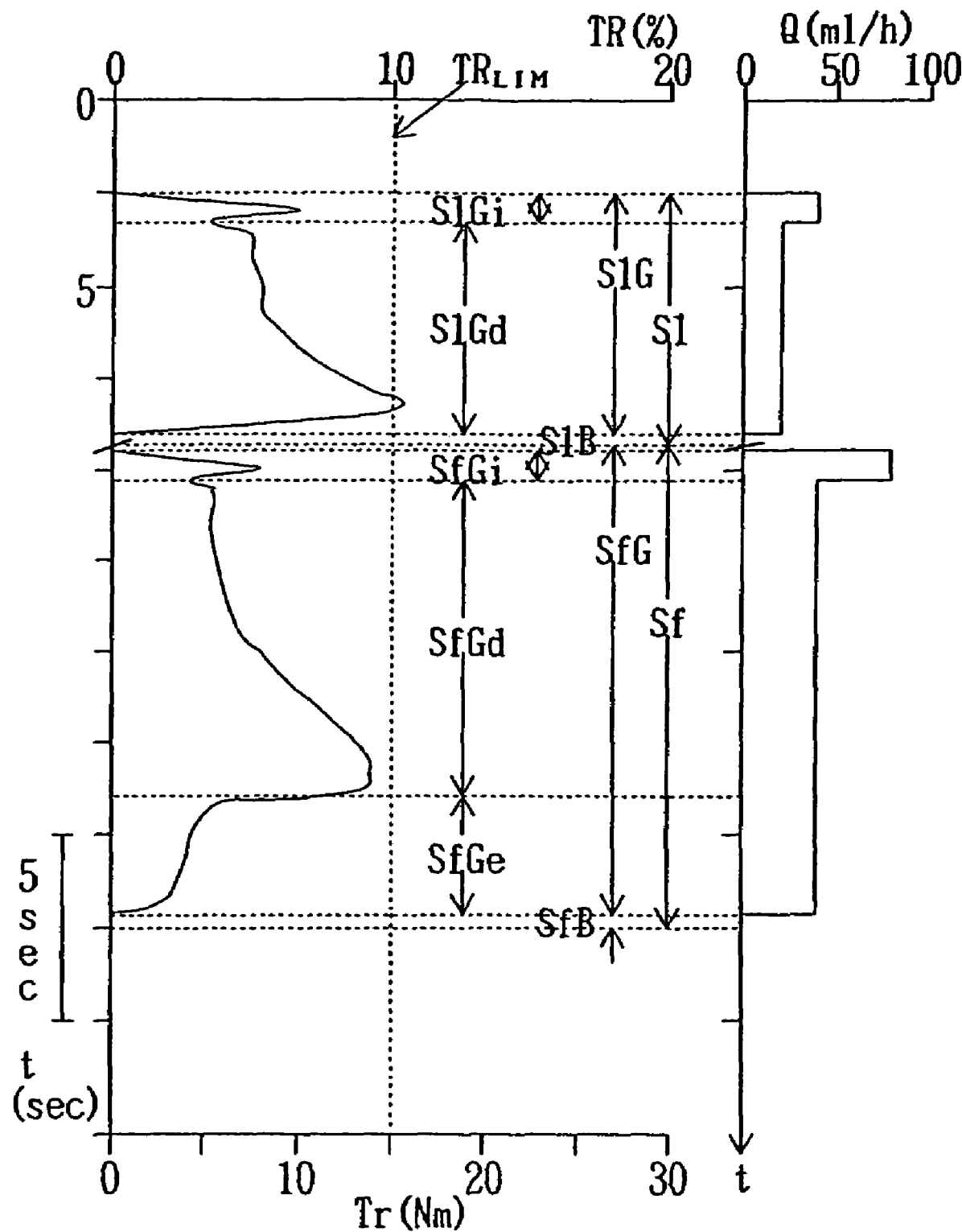
FIG. 6 is a partially abbreviated explanatory diagram of the main shaft torque rate variation characteristics corresponding to various processes in the boring control method showing Embodiment 6 of the present invention.

In the drawings of the embodiments of the present invention, FIG. 1 is an outline process explanatory diagram of the boring control method showing Embodiment 1 of the present invention, and FIG. 2 is a detailed process explanatory diagram of a boring control method showing Embodiment 2. FIG. 3 is a partially abbreviated explanatory diagram showing the variation characteristics of the main shaft torque rate corresponding to various processes in the boring control method which illustrates Embodiment 3. FIG. 4 is an outline process flow chart of the boring control method, showing Embodiment 4. FIG. 5 is an abbreviated explanatory diagram of the apparatus using the boring control method which illustrates Embodiment 5. FIG. 6 is a partially abbreviated explanatory diagram showing the variation characteristics of the main shaft torque rate corresponding to various processes in the boring control method which illustrates Embodiment 6.

Embodiments of the present invention will be described below. As shown in Embodiment 1 illustrated in FIG. 1, the boring control method is a boring control method for a machine tool in which deep holes are automatically bored using the central control means (20) that performs a boring process by program control using a tool (1) as a cutting implement, while constantly detecting the load torque of the tool using torque detection means, and while checking the position of the tip end portion of the tool from a desired reference point (R) in the Z axis direction of the workpiece (10) to the hole-bottom (Zf) using a Z axis movement device (6); and this method is characterized by the fact that the boring process is executed so that:

in a first step (S1),
 a forward path step process (S1G) comprising a first forward path step cutting process (S1Gd) which is a boring cutting process is initiated from the reference point (R) under fixed working conditions comprised of a specified pattern including working conditions comprised of the main shaft rotation number (S) which is the rotational speed of the tool, in cases where the load torque exceeds a torque limit value ($TR_{LIM}$) which is a specified predetermined threshold value at the first cut hole-bottom (Z1), the feeding rate (F) of the tool is stopped, and in a return path step process (S1B), the tool is withdrawn to the reference point (R) under fixed withdrawal conditions comprising a specified pattern; and subsequently, in a second step (S2),
 the tool is moved from the reference point (R) to the vicinity of the first cut hole-bottom (Z1) in a return path step movement process (S2Gm) of a return path step process (S2G), and a second return path step cutting process (S2Gd) which is a boring cutting process is initiated under fixed working conditions comprised of a specified pattern, in cases where the load torque exceeds the torque limit value ($TR_{LIM}$) at the second cut hole-bottom (Z2), the feeding rate (F) of the tool is stopped, and in a return path step process (S2B), the tool is withdrawn to the reference point (R) under the withdrawal conditions, and such a step (Sn) is repeated, and
in final (f) step (Sf),
 the tool reaches the hole-bottom (Zf), and the feeding rate (F) of the tool is stopped in the forward path step cutting process (SfGd), and
 the tool is withdrawn to the reference point (R) under the withdrawal conditions in the return path step (SfB), and
 the boring process is ended; and furthermore,
a condition which is such that the step number f of the final step (Sf) does not exceed a predetermined limiting step number N, i.e., a condition of $1 \leq f \leq N$, is set as the permissible range, and
a withdrawal and spot-checking process is provided in the boring process, in which at least when the step number f is N and the load torque exceeds the torque limit value ($TR_{LIM}$), then the feeding rate (F) of the tool is stopped, the boring process is interrupted the tool is withdrawn, and the cutting tip of the tool is checked.

As shown in Embodiment 1 illustrated in FIG. 1, the boring control method of the present invention is a boring control method for a machine tool which automatically bores deep holes using a central control means (20) that performs a boring process by program control using a tool (1) as a cutting implement while constantly detecting the load torque of the tool using torque detection means, and while checking the position of the tip end portion of the tool from a desired reference point (R) in the direction of Z axis of a workpiece (10) to the hole-bottom (Zf) using a Z axis movement device (6), characterized in that:

a mist generator (2a) which produces a mist-form mixture comprising a cutting liquid and compressed air, and which forcibly cools the machine tool up to the cutting tip with the minimum cutting liquid supply amount (Q) is provided inside the main shaft unit (2) that holds and rotates the tool of the machine tool, the tool cooling conditions including variations over time during operation are controlled using a mist control means (5) that controls the mist generation conditions of the mist generator, and the boring process is executed so that:
 in a first step (S1),
  the forward path step process (S1G) comprising the first forward path step cutting process (S1Gd) constituting the boring cutting process is initiated from the reference point (R) under fixed working conditions comprised of a specified pattern including working conditions comprised of a main shaft rotation number (S), which is the rotational speed of the tool, and a feeding rate (F) of the tool, while the tool is cooled under first tool cooling conditions, the feeding rate (F) of the tool is stopped in cases where the load torque exceeds the torque limit value ($TR_{LIM}$), which is a specified predetermined threshold value, at the first cut hole-bottom (Z1), and the tool is withdrawn to the reference point (R) under fixed withdrawal conditions comprising a specified pattern in the return path step process (S1B); and subsequently, in a second step (S2), the tool is moved to the vicinity of the first cut hole-bottom (Z1) from the reference point (R) in the forward path step movement process (S2Gm) of the forward path step process (S2G), the second forward path step cutting process (S2Gd) which is a boring process is initiated under fixed working conditions comprised of a specified pattern while the tool is cooled under second tool cooling conditions in which the cooling effect is heightened beyond that of the first tool cooling conditions, the feeding rate (F) of the tool is stopped in cases where the load torque exceeds the torque limit value ($TR_{LIM}$) at the second cut hole-bottom (Z2), the feeding rate (F) of the tool is stopped, and the tool is withdrawn to the reference point (R) under the withdrawal conditions in the return path step process (S2B); and such a step (Sn) is repeated, and the cooling effect of the n-th tool cooling conditions is heightened compared to at least the effect of the (n−1)st tool cooling conditions; and in the final (f) step (Sf), the tool reaches the hole-bottom (Zf), and the feeding rate (F) of the tool is stopped in the forward path step cutting process (SfGd), and the tool is withdrawn to the reference point (R) under the withdrawal conditions in the return path step process (SfB), and the boring process is ended; and furthermore, a condition which is such that the step number f of the final step (Sf) does not exceed a predetermined limiting step number N, i.e., a condition of $1 \leq f \leq N$, is set as the permissible range, and a withdrawal and spot-checking process is provided in the boring process, in which at least when the step number f is N and the load torque exceeds the torque limit value ($TR_{LIM}$), then the feeding rate (F) of the tool is stopped, the boring process is interrupted and the tool is withdrawn, and the cutting tip of the tool is checked.

Embodiment 2

In the boring control method of the present invention, as shown in Embodiment 2 illustrated in FIG. 2, the boring process can also be executed so that:

the n-th step (Sn) which has fixed working conditions comprised of a specified pattern consists of a forward path step process (SnG) and a return path step process (SnB), wherein the forward path step process (SnG) is constructed from a forward path step movement process (SnGm), a forward path step biting process (SnGi), and a forward path step cutting process (SnGd), the forward path step process (SnG) is initiated from the process (SnGm) in which the tool is moved from the reference point (R) to the n-th cutting reference point $Znr=(Zn-1)-s$, which is closer to the reference point (R) than the (n−1)st cut hole-bottom (Zn−1) of the preceding step (Sn−1) by a specified return distance s, with the main shaft rotation number (S) first raised to the working rotation number (S=5000 rotation number) in the forward path step movement process (SnGm), and with the feeding rate (F) set at a relatively rapid feeding rate (F=10,000 mm/min), in the next forward path step biting process (SnGi), biting is performed for a specified biting distance (i) (i=approximately 3 mm) with the main shaft rotation number (S) maintained at the working rotation number (S=5000 rotation number), and with the feeding rate (F) set at a relatively slow feeding rate (F=300 mm/min) in order to suppress a rise in the load torque caused by unstable conditions resulting from friction, dispersion of heat and the like during the biting of the cutting tip of the tool, in the next forward path step cutting process (SnGd), cutting is initiated with the main shaft rotation number (S) maintained at the working rotation number (S=5000 rotation number), and with the feeding rate (F) raised to the working feeding rate (F=600 mm/min), and in cases where the load torque exceeds the torque limit value ($TR_{LIM}$) at the n-th cut hole-bottom (Zn), the feeding rate (F) of the tool is stopped, and the working shifts to return path step process (SnB).

The above-described return path step process (SnB) can be constructed from a return path step return process (SnBs) and a return path step movement process (SnBm). First, in the return path step return process (SnBs), with the main shaft rotation number (S) maintained at the working rotation number (S=5000 rotation number), and with the magnitude of the feeding rate (F) maintained at the same cutting conditions of the working feeding rate (F=−600 mm/min), the tool is returned by a return distance of (s=approximately 1 mm) in the direction of the reference point (R); next, in the return path step movement process (SnBm), the main shaft rotation number (S) is lowered to a low main shaft rotation number (S=600 rotation number), the feeding rate (F) is raised to a fast-feed feeding rate (F=−10,000 mm/min), the tool is returned to the reference point (R), and the n-th step (Sn) is ended. The working then shifts to the (n+1)st step (Sn+1) which has fixed working conditions comprised of a similar pattern.

In the boring control method of the present invention, as shown in Embodiment 2 illustrated in FIG. 2, the boring process of the final (f) step (Sf) can be executed so that:

the f-th step (Sf) which has fixed working conditions comprised of a specified pattern is constructed from a forward path step process (SfG) and a return path step process (SfB), wherein the return path step process (SfB) is the same pattern as the return step process (SnB), but the forward path step process (SfG) is constructed from a forward path step movement process (SfGm), a forward path step biting process (SfGi), a forward path step cutting process (SfGd) and a forward path step withdrawal point process (SfGe), and the forward path step movement process (SfGm), forward path step biting process (SfGi) and forward path step cutting process (SfGd) are the same as the corresponding process conditions of the forward path step process (SnG) in cases where f=n, but the newly installed forward path step withdrawal point process (SfGe) is executed so that when the Z axis coordinate position of the tool (1) cutting tip approaches the hole-bottom (Zf) to within a specified withdrawal point distance (e=20 mm) during the forward path step cutting process (SfGd), the forward path step withdrawal point process (SfGe) is performed with the main shaft rotation number (S) maintained at the working rotation number (S=5000 rotation number), and with the feeding rate (F) decelerated to the withdrawal point feeding rate (F=300 mm/min) from the working feeding rate (F=600 mm/min) in order to alleviate working instability during withdrawal point working.

In the boring control method of the present invention, the torque detection means that detects the load torque of the tool (1) can be devised so that the load current of the main shaft motor which rotationally drives the main shaft unit (2) to which the tool is attached is detected by the main shaft control means (8) at a specified sampling time ($S_{TR}$=approximately 16 ms) and read at a specified reading frequency ($N_S$=5), the mean value (TR) is calculated and taken as the detected torque rate (TR), the torque rate (TR) is used here to express the rated value of the main shaft motor as 100%, the torque limit value ($TR_{LIM}$) which is a specified threshold value is determined beforehand, and if all of the detected torque rates (TR) exceed the torque limit value ($TR_{LIM}$=10%) within a specified detection time ($\Delta T$=0.5 sec $>> S_{TR} \times N_S$), the feeding rate (F) of the tool is stopped.

Embodiment 3

In the boring control method of the present invention, as shown in Embodiment 3 illustrated in FIG. 3 wherein the variation characteristics of the main shaft torque rate corresponding to the respective processes in the boring process are indicated, $TR_{LIM}$=10% is used as the torque limit rate, a torque rate TR of 10% corresponds to a torque Tr of 15 Nm, and the tool reaches the hole-bottom (Zf) in the final (f=3) step (Sf). In both of the steps S1 and S2 (n=1, 2), a similar variation in the main shaft torque rate is indicated. In the forward path step biting process (SnGi), a rise in the main shaft torque rate is observed even if the main shaft rotation number (S) is maintained at the working rotation number (S=5000 rotation number) and the feeding rate (F) is set at a relatively slow feeding rate (F=300 mm/min). In the forward path step cutting process (SnGd), when cutting is initiated with the main shaft rotation number (S) maintained at the working rotation number (S=5000 rotation number) and the feeding rate (F) raised to the working feeding rate (F=600 mm/min). The torque detected by the torque detection means set at a detection time of $\Delta T$=0.5 sec exceeds the torque limit value $TR_{LIM}$=10%, and the working shifts to the subsequent return path step process (SnB). In the boring process of the final (f=3) step (Sf), when the Z axis coordinate position of the cutting tip approaches the hole-bottom (Zf) to with a specified withdrawal point distance (e=20 mm), the forward path step withdrawal point process (SfGe) is performed with the main shaft rotation number (S) maintained at the working rotation number (S=5000 rotation number), and with the feeding rate (F) reduced from the working feeding rate (F=600 mm/min) to the withdrawal point feeding rate (F=300 mm/min).

Embodiment 4

In the boring control method of the present invention, the boring process of Embodiment 4 includes a withdrawal and spot-checking process which has a condition that a predetermined limiting step number does not exceeded N number of steps. As shown in the flow chart of FIG. 4, the boring process is characterized by the following steps: namely, the process is initiated in a stage (P0); subsequently, in a reference point movement process of a stage (P1), the tool (1) is moved to a reference point (R); subsequently, in the forward path step cutting process (SnGd) of a stage (P2), boring cutting is initiated; subsequently, in the hole-bottom reaching process of a stage (P3), if the tool does not reach the hole-bottom (Zf), then go to (NO), and boring cutting is continued; then, in the torque limit process of a subsequent stage (P4), in cases where the load torque exceeds the torque limit value ($TR_{LIM}$) which is a specified predetermined threshold value, then go to (YES), and the feeding rate (F) of the tool is stopped; then, in the step addition process of a subsequent stage (P5), 1 is added to n up to this point so that n=n+1, and if n does not equal N, then go to (NO) in the n=N process of a subsequent stage (P6), and if n does not equal N−1, then go to (NO) in the n=N−1 process of a subsequent stage (P7), the processing skips to the position reading process of a subsequent stage (P9), however, if n=N−1, notification that the step number n has approached the limiting step number N is made on the display device of the input-output control device (9), and a warning may also be activated; in the position reading process of a subsequent stage (P9), the position of Z=Zn which is the position where the feeding rate (F) of the tool is stopped is read and confirmed using a Z axis movement device (6); then, in the return path step process (SnB) of a subsequent stage (P10), the tool is returned to the reference point (R), and the n-th step (Sn) is ended; in the forward path step movement process (SnBm) of a subsequent stage (P11), the (n+1)st step is initiated, the tool is moved from the reference point (R) to the (n+1)st cutting reference point Z(n+1)r=(Zn)−s, which is closer to the reference point (R) than the n-th cut hole-bottom (Zn) of the preceding step (Sn) by a return distance of s, and the tool returns to the forward path step cutting process (SnGd) of the stage (P2); on the other hand, if the tool reaches the hole-bottom (Zf), then go to (YES) in the hole-bottom reaching process of stage (P3), the feeding rate (F) of the tool is stopped; then, n is set equal to f in the return path step process (SfB) of a subsequent stage (P20), and the tool is returned to the reference point (R) and stopped; next, n is reset to zero in the step number reset process of a subsequent stage (P21), and the above-described series of boring processes is ended in a subsequent stage (P30); on the other hand, if n=N, then go to (YES) in the n=N process of stage (P6), a notification that the step number n has reached the limiting step number N is shown on the display device of the input-output control device (9) in an "N times" checking and display process of a subsequent stage (P25), the tool is returned to the reference point (R) and stopped, and the cutting tip of the tool is checked by performing a withdrawal and spot checking process of a subsequent stage (P26); on the other hand, in cases where the load torque does not exceed the torque limit value ($TR_{LIM}$), which is a specified predetermined threshold value, then go to (NO) in the torque limiting process of stage (P4), the tool is returned to the forward path step cutting process (SnGd) of stage (P2), and the boring cutting is continued.

In the boring control method of the present invention, in the case of working conditions where the diameter of the tool (1) is 6 mm, the material of the workpiece (10) is iron, and the distance to the hole-bottom (Zf) is approximately 100 mm, then the number of the final step (Sf) of working is ordinarily f≦3, and the limiting step number N is set so that N=4.

Embodiment 5

As shown in Embodiment 5 illustrated in FIG. 5, the boring control method of the present invention is a boring control method for a machine tool in which a mist generator (2a) that produces a mist-form mixture of a cutting liquid and compressed air and that cools a tool with the minimum cutting liquid supply amount (Q) is provided in the main shaft unit (2) that holds and rotates a tool (1), the machine tool has a function that controls the mist generation conditions of the mist generator, and the machine tool comprises a device that controls the tool cooling conditions including variations over time during operation using the mist control means (5) basically disclosed in Japanese Patent Application Laid-Open (Kokai) No. 2001-334438 "Cutting Liquid Automatic Supply Device"; and the method of Embodiment 5 is characterized by the fact that boring that bores deep holes automatically is performed using a central control means (20) that performs a boring process by program control while checking the position of the tip end portion of the tool from a desired reference point (R) in the Z axis direction of the workpiece (10) to a hole-bottom (Zf) using a Z axis movement device (6) via a movement control means (7), a torque detection means that detects the load torque of the tool detect the load current of a main shaft motor (which rotationally drives the main shaft unit) at a specified sampling time using a main shaft control means (8), and the mist control means that controls the mist generation conditions also controls the cutting liquid supply amount (Q) using a cutting liquid supply means (3) or also controls and ensures the air pressure (Pr) of the compressed air that is supplied using a compressed air supply means (4).

Embodiment 6

In the boring control method of the present invention, as shown in Embodiment 6 illustrated in FIG. 6 wherein the variation characteristics of the main shaft torque rate corresponding to the respective processes in the boring process are indicated, $TR_{LIM}=10\%$ is used as the torque limit rate, a torque rate TR of 10% corresponds to a torque Tr of 15 Nm, and the tool reaches the hole-bottom (Zf) in the final (f=2) step (Sf). More specifically, in the forward path step biting process (S1Gi) of the first step S1, even if the cutting liquid supply rate Q is set as 40 ml/h as the tool cooling conditions while the main shaft rotation number (S) is maintained at the working rotation number (S=5000 rotation number) and the feeding rate (F) is set at a relatively slow feeding rate (F=300 mm/min), a rise in the main shaft torque rate is observed. In the forward path step cutting process (S1Gd), if cutting is initiated with the cutting liquid supply rate Q reduced to 20 ml/h, the main shaft rotation number (S) is maintained at the working rotation number (S=5000 rotation number) and the feeding rate (F) is raised to the working feeding rate (F=600 mm/min), then the main shaft torque rate gradually rises, the torque detected by the torque detection means set at a detection time of ΔT=0.5 sec exceeds the torque limit value $TR_{LIM}=10\%$, and the working shifts to the subsequent return path step process (SnB). In the boring process of the final (f=2) step (Sf), if the tool cooling conditions of the preceding S1 are increased stepwise in the forward path step biting process (SfGi), and if the cutting liquid supply rate Q is set at 80 ml/h, the main shaft rotation number (S) is maintained at the working rotation number (S=5000 rotation number) and the feeding rate (F) is set at a relatively slow feeding rate (F=300 mm/min), then the rise in the main shaft torque rate is reduced compared to S1Gi of the preceding S1; however, a rise does occur. In the forward path step cutting process (S2Gd), if cutting is initiated with the cutting liquid supply rate Q reduced to 40 ml/h, the main shaft rotation number (S) maintained at the working rotation number (S=5000 rotation number) and the feeding rate (F) raised to the working feeding rate (F=600 mm/min), then the main shaft torque rate gradually rises; however, this rise is more gradual than in S1Gd of the preceding S1. Furthermore, when the Z coordinate position of the cutting tip approaches the hole-bottom (Zf) to within a specified withdrawal point distance (e=20 mm), the process shifts to the forward path step withdrawal point process (SfGe); and in this case, the main shaft rotation number (S) is maintained at the working rotation number (S=5000 rotation number), and the feeding rate (F) was reduced from the working feeding rate (F=600 mm/min) to the withdrawal point feeding rate (F=300 mm/min). In this way, since the tool cooling conditions are increased in stages from step S1 to step S2, the tool reaches the hole-bottom (Zf) in the final (f=2) step (Sf), and the boring process can be ended.

In the boring control method of the present invention, in the case of working conditions where the diameter of the tool (1) is 6 mm, the material of the workpiece (10) is iron and the distance to the hole-bottom (Zf) is approximately 100 mm, the tool cooling conditions are increased in stages as the steps increase. Accordingly, the limiting step number N was set at 4. Ordinarily, however, the number of the final step (Sf) of working is f≦2.

When the boring control method of FIG. 6 of the present invention is compared with the method of FIG. 3, as is seen by comparing Embodiment 6 of FIG. 6 with Embodiment 3 of FIG. 3, it is found that since the tool cooling conditions are increased in stages with an increase in the steps in the boring control method of FIG. 6, the main shaft torque gradually decreases, and the number of the final step (Sf) is reduced from f≦3 to f≦2. Thus, the number f of the final step (Sf) is reduced, so that an effect that suppresses damage to the tool (1) is obtained.

INDUSTRIAL APPLICABILITY

The present invention is worked in the configurations described above and has the merits described below.

In the boring control method of the present invention, the respective steps in the boring process are determined only by a specified predetermined torque limit value, working is continued up to this torque limit value, so that the working distance can be extended to the torque limit value while suppressing damage to the tool. Accordingly, the present invention has the merit of minimizing the total number of steps f. Furthermore, since each step is performed under fixed working conditions comprised of a specified pattern, the present invention has the merit of minimizing the working time.

In the boring control method of the present invention, a condition requiring that the total step number f not exceed a predetermined limiting step number N can be set in the boring process. Accordingly, the present invention has the merit of suppressing extreme wear, damage and scratching of the tool, and also has the merit of being suitable for reutilization of the tool.

In the boring control method of the present invention, a forward path step biting process (SnGi) can be set in the boring process at the time of initiation of working in each step, and these steps can be initiated with the feeding rate (F) set at a relatively low feeding rate, so that a rise in the load torque caused by unstable conditions resulting from wear, the dispersion of heat or the like during biting of the cutting tip of the tool can be suppressed. Accordingly, the working distance can be extended to the torque limit value, and an effect that suppresses damage to the tool can also be obtained.

In the boring control method of the present invention, a forward path step withdrawal point process (SfGe) can be set in the boring process in the interval following the completion of working in the final step, so that this process can be performed with the feeding rate (F) reduced from the working feeding rate to the withdrawal point feeding rate, thus reducing working instability of the cutting tip of the tool during withdrawal point working so that a rise in the load torque can be suppressed. Accordingly, the working distance can be extended to the torque limit value, and an effect that suppresses damage to the tool can also be obtained.

In the boring control method corresponding to FIG. 6 of the present invention, the tool cooling effect is increased in stages as the steps increase. Accordingly, the main shaft torque rate gradually decreases, and the total step number f is reduced compared to the method corresponding to FIG. 3, so that an effect that suppresses damage to the tool is obtained.

The invention claimed is:

1. A boring control method for a machine tool which automatically bores deep holes using a central control means (20) that performs a boring process by program control, while constantly detecting, by a torque detection means that detects load torque of a tool (1), a load current of a main shaft motor so as to read said load current at a specified sampling time ($S_{TR}$) and at a specified reading frequency ($N_S$), so that a mean value (TR) thereof is calculated and taken as a detected torque rate (TR), and said torque rate (TR) is compared with a torque limit value ($TR_{LIM}$) within a specified detection time ($\Delta T$), and while checking a position of a tip end portion of said tool from a desired reference point (R) in a direction of Z axis of a workpiece (10) to a hole-bottom (Zf) using a Z axis movement device (6), characterized in that said boring process is executed so that:

in a first step (S1),
a forward path step process (S1G) comprising a first forward path step cutting process (S1Gd) constituting a boring cutting process is initiated from said reference point (R) under fixed working conditions comprised of a specified pattern including working conditions comprised of a main shaft rotation number (S), which is a rotational speed of said tool, and a feeding rate (F) of said tool,
said feeding rate (F) of said tool is stopped when said load torque exceeds a torque limit value ($TR_{LIM}$), which is a specified predetermined threshold value, thus taking a position where said tool is stopped as a first cut hole-bottom (Z1), and
said tool is withdrawn to said reference point (R) under fixed withdrawal conditions comprising a specified pattern in a return path step process (S1B); and
subsequently, in a second step (S2),
said tool is moved from said reference point (R) to the vicinity of said first cut hole-bottom (Z1) in a forward path step movement process (S2Gm) of a forward path step process (S2G), and a second forward path step cutting process (S2Gd) which is a boring cutting process is initiated under predetermined working conditions comprising a specified pattern,
said feeding rate (F) of said tool is stopped when said load torque exceeds a torque limit value ($TR_{LIM}$) of said tool, thus taking a position where said tool is stopped as a second cut hole-bottom (Z2), and
said tool is withdrawn to said reference point (R) under predetermined withdrawal conditions comprising a specified pattern in a return path step process (S2B); and
such a step (Sn) is repeated; and
in a final (f) step (Sf),
said tool reaches said hole-bottom (Zf), and the feeding rate (F) of said tool is stopped in a forward path step cutting process (SfGd), and
said tool is withdrawn to said reference point (R) under predetermined withdrawal conditions comprising a specified pattern in a return path step process (SfB); and
said boring process is ended.

2. The boring control method according to claim 1, characterized in that:
a condition requiring that a step number f not exceed a predetermined limiting step number N is set, and
a withdrawal and spot checking process is provided in said boring process so that at least when said step number f reaches N, and said load torque exceeds said torque limit value, then said feeding rate (F) of said tool is stopped, said boring process is interrupted and said tool is withdrawn, and a cutting tip of said tool is checked.

3. The boring control method according to claim 1 or 2, characterized in that said step (Sn) repeated each includes a forward path step biting process (SfGi) at a beginning of working, and said final (f) step (Sf) includes a forward path step biting process (SfGi) at a beginning of working.

4. The boring control method according to any one of claims 1 and 2, characterized in that said final (f) step (Sf) includes a forward path step withdrawal point process (SfGe) wherein when a tool cutting tip approaches a position of a target hole-bottom within a specified distance, a working up to said target hole-bottom is performed with said feeding rate (F) decelerated to a withdrawal point feeding rate from a working feeding rate.

5. The boring control method according to claim 3, characterized in that said final (f) step (Sf) includes a forward path step withdrawal point process (SfGe) wherein when a tool cutting tip approaches a position of a target hole-bottom within a specified distance, a working up to said target hole-bottom is performed with said feeding rate (F) decelerated to a withdrawal point feeding rate from a working feeding rate.

6. A boring control method for a machine tool which automatically bores deep holes using a central control means (20) that performs a boring process by program control while constantly detecting load torque of a tool (1) using a torque detection means, and while checking a position of a tip end portion of said tool from a desired reference point (R) in a direction of Z axis of a workpiece (10) to a hole-bottom (Zf) using a Z axis movement device (6), characterized in that:
a mist generator (2*a*), which produces a mist-form mixture comprising a cutting liquid and compressed air and which forcibly cools said tool up to a cutting tip thereof with a minimum cutting liquid supply amount (Q), is provided inside a main shaft unit (2) that holds and rotates said tool;
tool cooling conditions including variations over time during operation are controlled using a mist control means (5) that controls mist generation conditions of said mist generator; and said boring process is executed so that:
in a first step (S1),
a forward path step process (S1G) comprising a first forward path step cutting process (S1Gd) constituting a boring cutting process is initiated from said reference point (R) under fixed working conditions comprised of a specified pattern including working conditions comprised of a main shaft rotation number (S), which is a rotational speed of said tool, and a feeding rate (F) of said tool, while said tool is cooled under first tool cooling conditions,
said feeding rate (F) of said tool is stopped when said load torque exceeds a torque limit value ($TR_{LIM}$), which is a specified predetermined threshold value, thus taking a position where said tool is stopped as a first cut hole-bottom (Z1), and
said tool is withdrawn to a reference point (R) under fixed withdrawal conditions comprising a specified pattern in a return path step process (S1B);
subsequently, in a second step (S2),
said tool is moved to the vicinity of said first cut hole-bottom (Z1) from said reference point (R) in a forward path step movement process (S2Gm) of a forward path step process (S2G),
a second forward path step cutting process (S2Gd) which is a boring process is initiated under predetermined working conditions comprising a specified pattern while said tool is cooled under second tool cooling conditions in which a cooling effect is heightened beyond that of said first tool cooling conditions,
said feeding rate (F) of said tool is stopped when said load torque exceeds a torque limit value ($TR_{LIM}$) of said tool, thus taking a position where said tool is stopped as a second cut hole-bottom (Z2), and
said tool is withdrawn to said reference point (R) under predetermined withdrawal conditions comprising a specified pattern in a return path step process (S2B); and
such a step (Sn) is repeated; and
a cooling effect of n-th tool cooling conditions is heightened compared to at least an effect of (n−1)st tool cooling conditions; and
in a final (f) step (Sf),
the tool reaches said hole-bottom (Zf) and the feeding rate (F) of said tool is stopped in a forward path step cutting process (SfGd), and
said tool is withdrawn to said reference point (R) under predetermined withdrawal conditions comprising a specified pattern in a return path step process (SfB); and
said boring process is ended.

7. The boring control method according to claim 6, characterized in that:
a condition requiring that a step number f not exceed a predetermined limiting step number N is set, and
a withdrawal and spot checking process is provided in said boring process so that at least when said step number f reaches N, and said load torque exceeds said torque limit value, then said feeding rate (F) of said tool is stopped, said boring process is interrupted and said tool is withdrawn, and a cutting tip of said tool is checked.

* * * * *